United States Patent [19]

Daniels et al.

[11] Patent Number: 5,734,005
[45] Date of Patent: Mar. 31, 1998

[54] AROMATIC POLYMERS

[75] Inventors: James Anthony Daniels, Yarm; Ian Richard Stephenson, Dumnow, both of Great Britain

[73] Assignee: Victrex Manufacturing Limited, Lancashire, Great Britain

[21] Appl. No.: 700,364

[22] PCT Filed: Mar. 2, 1995

[86] PCT No.: PCT/GB95/00446

§ 371 Date: Oct. 29, 1996

§ 102(e) Date: Oct. 29, 1996

[87] PCT Pub. No.: WO95/23821

PCT Pub. Date: Sep. 8, 1995

[30] Foreign Application Priority Data

Mar. 2, 1994 [GB] United Kingdom ............... 9403944

[51] Int. Cl.⁶ .................................................. C08G 8/02
[52] U.S. Cl. ................ 528/222; 528/223; 528/224; 528/225; 528/226; 525/242; 525/280; 525/309
[58] Field of Search ............................... 528/222, 223, 528/224, 225, 226; 525/242, 280, 309

[56] References Cited

U.S. PATENT DOCUMENTS

| | | | |
|---|---|---|---|
| 4,698,383 | 10/1987 | Jansons et al. | 525/242 |
| 4,841,011 | 6/1989 | Towle | 525/242 |
| 4,912,195 | 3/1990 | Jansons et al. | 528/222 |
| 5,089,596 | 2/1992 | Cliffton et al. | 528/226 |

*Primary Examiner*—John M. Cooney, Jr.
*Attorney, Agent, or Firm*—Nikaido Marmelstein & Murray & Oram, LLP

[57] ABSTRACT

Polyarylketones are made by electrophilic substitution using a dispersant for the polymer. The dispersant comprises a polymer having first pendent groups which are substantially compatible with the reaction mixture but are substantially incompatible with the polymer and second pendent groups which comprise Lewis bases. Preferred dispersants are copolymers of aliphatic vinyl compounds and N-vinyl pyrollidone, particularly of 1-eicosene ($CH_3(CH_2)_{17}CH=CH_2$) and N-vinyl pyrollidone in which the ratio of first groups to second groups is in the range 1.5:1 to 0.5:1, and more preferably is 1:1.

16 Claims, No Drawings

AROMATIC POLYMERS

This invention relates to aromatic polymers.

Aromatic polyethers are known, useful polymers which have been produced by a variety of methods. The methods are usually based on two reaction types, namely electrophilic aromatic substitution (e.g. the polycondensation of acid chlorides or carboxylic and/or sulphonic acids with aryl ethers to produce ketone or sulphone linkages) and nucleophilic aromatic substitution (e.g. the polycondensation of activated aryl fluorides with phenoxides to produce ether linkages). Examples of such methods as applied to ketone polymers have been reviewed by M J Mullins and E P Woo, J Macromolecular Science—Rev. Macromol Chem Phys, C27 (2), 313, 1987.

Polyaryletherketones are particularly useful since they are usually crystalline, have relatively high glass transition temperatures (Tg's) and melting temperatures (Tm's) and exhibit a variety of useful properties such as excellent electrical insulating and mechanical properties at high temperature and high strength, toughness and resistance to fire and chemicals.

One of the problems associated with making such polymers by the electrophilic route is that, unless the reaction is carried out in strongly acidic solvent systems such as $HF/BF_3$ or perfluoroalkyl-sulphonic acids, the semi-crystalline nature of the polymers causes them to be precipitated from conventional organic solvents before high molecular weights can be achieved. Under typical conditions, the relatively low molecular weight polymers, complexed with the Friedel-Crafts acid such as $AlCl_3$ which activates the reaction, precipitate out as gel-like materials which coat the walls and stirrer of the reaction vessel. Subsequent extraction, manipulation and purification is consequently difficult.

It has been proposed in U.S. Pat. No. 3,791,890, and is further illustrated in U.S. Pat. No. 4,704,448 and EP-A-0192260, to overcome this problem by mixing the reaction mixture with a fluid medium at a temperature above the temperature of the reaction mixture to effect dispersion of the mixture and to complete the polymerisation reaction.

It has also been proposed in U.S. Pat. No. 4,698,393 to overcome the problem by adding a dispersant to the reaction mixture, the dispersant having a portion compatible with the polymer and incompatible with the diluent in which the reaction is carried out and having a portion compatible with the diluent and incompatible with the polymer under the reaction conditions used.

U.S. Pat. No. 4,698,393 teaches that the dispersant can be a polymeric or a non-polymeric dispersant and identifies a wide variety of compounds which are alleged to be suitable dispersants. However, it only exemplifies a limited number of such compounds and, in particular, exemplifies using benzoylated Kraton G 1650 (Kraton G 1650 being a hydrogenated styrenebutadeine copolymer available from Shell Chemical Co.). U.S. Pat. No. 4,698,393 also teaches the amount of dispersant can be in the range 0.01% to 10% by weight based on the weight of monomers in the reaction. However, it only exemplifies reaction systems in which the amount of dispersant is about 2% or more.

However, it has been found that, under similar but not identical reaction conditions to those specifically exemplified in U.S. Pat. No. 4,698,393, a number of materials falling within the teaching of U.S. Pat. No. 4,698,393 do not act as dispersants or do not act as dispersants in relatively low quantities, i.e. not more than 2%, low quantities of dispersant being desirable to reduce the effort required to extract them from the polymer. Indeed, it was found that the minimum quantity of the apparently preferred dispersant benzoylated Kraton G 1650 required to obtain a dispersant effect was about 2% by weight.

It has now been found that selected materials are particularly effective as dispersants in the electrophilic preparation of polyarylketones, particularly at relatively low quantities of such materials.

According to the present invention, a process for making a polyarylketone comprises polycondensing at least one aromatic monomer capable of undergoing electrophilic substitution to form a polyarylketone in the presence of a Lewis acid capable of activating the condensation reaction and a dispersant for the polymer, said dispersant comprising a polymer having first pendent groups which are substantially compatible with the reaction mixture but are substantially incompatible with the polymer and second pendent groups which comprise Lewis bases.

Preferably, the condensation is carried out under such conditions that, in the absence of the dispersant, the forming polymer would not remain in solution.

The dispersant may be selected such that the ratio of said first groups to said second groups is less than 2:1, preferably is in the range 1.5:1 to 0.5:1 and more preferably is 1:1.

Although the dispersant can be present in the process in relatively large quantities, e.g. up to a practical limit of about 10% by weight based on the weight of monomers, it is preferred that the dispersant is present in quantities not more than 2%, particularly not more than 1.5%, by weight based on the weight of monomers.

The dispersant preferably has an aliphatic polymer backbone to which the pendent groups are attached.

The first pendent groups are preferably aliphatic chains, preferably having a length of between 10 and 30 carbon atoms, more preferably between 15 and 25 carbon atoms. Especially preferred is the case wherein said aliphatic chains have a length between 16 to 20 carbon atoms.

The second pendent groups preferably contain a nitrogen atom. The second pendent groups preferably contain an oxygen atom. Said oxygen atom is preferably part of a carbonyl group.

Said second pendent groups preferably include a moiety of general formula

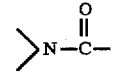

preferably wherein the nitrogen and carbon atoms of said moiety form part of a cyclic moiety. Said cyclic moiety may comprise five or six ring atoms. It preferably has five ring atoms.

Where the dispersant has an aliphatic backbone, said second pendent groups are preferably bonded to the backbone via said nitrogen atom.

Preferably, said second pendent groups comprise N-pyrollidone moieties.

Preferred dispersants are copolymers of aliphatic vinyl compounds and N-vinyl pyrollidone, particularly of 1-eicosene $(CH_3(CH_2)_{17}CH\!=\!CH_2)$ and N-vinyl pyrollidone in which the ratio of first groups to second groups is in the range 1.5:1 to 0.5:1, and more preferably is 1:1.

The term "polyarylketone" as herein used is intended to mean aromatic polymers in which at least some of the aromatic moieties forming the polymer chain are connected by ketone linkages but it is not intended to exclude polymers in which other linkages, preferably selected from a direct link, —O—, —S—, —SO$_2$— or —CR$_2$— where R is hydrogen, C$_1$ to C$_4$ alkyl, phenyl or the two groups R (which otherwise may be the same or different) are joined externally to form a cycloaliphatic ring, are present. It is preferred, however, that the amount of —SO$_2$— linkages present in the polymer is not sufficient to substantially affect the solvent resistance of the polymer. Preferably, the ratio of —SO$_2$— linkages to —CO— linkages between aromatic moieties is not more than 1:5, preferably not more than 1:10.

Monomers for use in the invention are well known in the art and include self-condensing acid halides and dihydrogen and diacid dihalide monomer systems. reference is made to U.S. Pat. Nos. 3,956,240 and 4,698,393 for illustrations of such monomers.

Preferred monomers for use in the process of the invention are preferably selected from monomers comprised by a divalent aromatic residue consisting of one or more phenylene units connected by linkages selected from a direct link, —O—, —S—, —CO—, —SO$_2$— or —CR$_2$— where R is hydrogen, C$_1$ to C$_4$ alkyl, phenyl or the two groups R (which otherwise may be the same or different) are joined externally to form a cycloaliphatic ring, are present or of polynuclear aromatic units either alone or with like units and/or phenylene units linked as aforesaid.

Examples of preferred aromatic monomers for use in the invention are:

diphenylether
4,4'-diphenoxybenzophenone
4,4'-diphenoxydiphenylsulphone
dibenzofuran
1,4-bis(4-phenoxybenzoyl)benzene (i.e. Ph—O—Ph—CO—Ph—CO—Ph—O—Ph where Ph is 1,4-phenylene) and their thioether equivalents;
biphenyl
1,2-, 1,3- or, preferably, 1,4-diphenylbenzene
naphthalene
anthracene
phenanthrene
or:
Ph—CR$_2$—Ph
wherein Ph is 1,4-phenylene and C$_2$ is as hereinbefore defined, R preferably being —C(CH$_3$)$_2$—; the monacid halide and diacid dihalides of such monomers; and terephthaloyl chloride and isophthaloyl chloride.

If required, a small proportion of an aromatic compound which will end cap the polymer chain can be used. For example, such a compound can be one of the reaction monomers which is present in excess of stoichiometric requirements; or, alternatively, a chain-terminator such as 4-phenoxybenzophenone. Preferably, the end-capping compound is added at the start of the reaction.

The reaction of the monomers is carried out in a solvent or diluent. Suitable solvents are aprotic solvents which do not contain strong Lewis base substituents and which are thermally stable in the presence of the Friedel-Crafts activator at the reaction temperatures involved, i.e. up to about 200° C. Preferred solvents are 1,2-dichlorobenzene and 1,2,4-trichlorobenzene.

The invention is illustrated by reference to the following examples.

The inherent viscosities of the polymeric products were determined using a 0.1% solution in concentrated sulphuric acid (98%) at 25° C. and the Tg and Tm were determined using a differential scanning calorimeter.

The percentages of dispersant used are percentages by weight based on the weight of monomers used in the reactions.

By "tough film" in the examples is meant a film which can be hinged through 180° (i.e. so that two faces of the film formed about the hinge touch) followed by hinging several times (at least five) about the crease so formed (i.e. so that the opposed faces on each side of the film about the hinge touch each other alternately) without breaking (e.g. snapping or tearing).

By "free-flowing" in the examples is meant a polymer which is particulate in form without having been subjected to a grinding step in the isolation procedure.

In the examples, the following abbreviations are used:

IV—inherent viscosity
TPC—terephthaloyl chloride
IPC—isophthaloyl chloride
DPO—diphenylether
DPBP—4,4'-diphenoxybenzophenone
DPDPS—4,4'-diphenoxydiphenylsulphone
BPBB—1,4-bis-(4-phenoxybenzoyl)benzene
DCB—1,2-dichlorobenzene
NNDA—N,N-dimethylacetamide.

The following materials were tested as potential dispersants:

| | | |
|---|---|---|
| 1. | Antaron V220 | a polymer of 1-eicosene and N-vinyl pyrollidone available from GAF Corporation and in which the ratio of first groups to second groups is 1:1; |
| 2. | | benzoylated Kraton G 1650 prepared as described in US-A-46983932; |
| 3. | Antaron V216 | a polymer of CH$_3$(CH$_2$)$_{15}$CH=CH$_2$ and N-vinyl pyrollidone in the ratio of 2:1 olefin:pyrollidone (i.e. a first group to second group ratio of 2:1 available from GAF Corporation; |
| 4. | Antara V430 | a 50:50 copolymer of styrene and N-vinyl pyrollidone available from GAF Corporation; |
| 5. | Surfadone LP100 | N-octyl pyrollidone available from GAF Corporation; |
| 6. | Surfadone LP300 | N-dodecyl pyrollidone available from GAF Corporation; |
| 7. | | polyvinyl pyrollidone available from GAF Corporation, |
| 8. | | cetyl trimethyllammonium bromide, i.e. CH$_3$(CH$_2$)$_{15}$N(CH$_3$)Br; |
| 9. | | lithium stearate, i.e. CH$_3$(CH$_2$)$_{16}$CO$_2$Li; |
| 10. | | sodium stearate, i.e CH$_3$(CH$_2$)$_{16}$CO$_2$Na; |
| 11. | | palmitic acid; |
| 12. | | glycidylmethacrylate/methylmethacrylate/poly-1,2-hydroxystearic acid; |
| 13. | | bentonite 38 gel. |

EXAMPLE 1

To a 250 ml flanged flask equipped with a stirrer and purged with nitrogen was added 50 ml DCB, the flask and contents then being cooled in an ice bath. Aluminium chloride (22.0 g, 0.16 mole) was added to the flask following which the contents of the flask were stirred. TPC (8.12 g, 0.04 mole), DPO (6.80 g, 0.04 mole) dissolved in DCB (80 ml) and Antaron V220 (0.8 g, 5.36%) were then added to the flask.

The flask was removed from the ice bath and the flask and the contents thereof were allowed to warm up to room temperature. After stirring at room temperature for one hour, the flask and its contents were heated up to 100° C. at which temperature it was held for four hours. During that period, a milky orange dispersion of polymer particles formed in the flask. The flask and its contents were then cooled to room temperature, stirring of the contents being maintained.

The contents of the flask were poured into a methanol (750 ml)/concentrated HCl (6 ml) solution. The resultant fine white granular solid was filtered off the liquor and washed with methanol on the filter. The product was then extracted with hot water, filtered and washed again with methanol before being dried in a vacuum oven for three hours at 120° C.

The final product was a free-flowing white particulate solid (11.75 g, 97.9% yield), which had an IV=0.79 dlg$^{-1}$, a Tg=169° C. and a Tm=390° C.

EXAMPLE 2

(Comparative)

Example 1 was repeated but without using any Antaron V220. After 30 minutes at 100° C., polymer particles began to coat the stirrer and the sides of the flask. Stirring became very difficult to control as the sticky polymeric product coagulated into a gummy mass.

After four hours, the product had completely separated from the solvent. After cooling, the solvent was poured from the flask and the product was transferred with some difficulty to the methanol/HCl solution. The red/orange product was slow to lose its colour. Vigourous stirring with a high shear stirrer eventually resulted in a coarse powder. Following purification, the white solid (11.3 g, 94.2% yield) had an IV=0.34 dlg$^{-1}$, a Tg=145° C and a Tm=395° C.

EXAMPLE 3

Example 1 was repeated but using 60 ml DCB, aluminium chloride (11.0 g, 0.08 mole) TPC (4.06 g, 0.02 mole), DPO (6.80 g, 0.04 mole) dissolved in DCB (60 ml) and Antaron V220 (0.4 g, 3.68%). After the contents of the flask were stirred for three hours at room temperature, aluminium chloride (11.0 g, 0.08 mole) and TPC (4.06 g, 0.02 mole) were added to the flask following which the procedure of Example 1 was continued.

The final product was a free-flowing white particulate solid (11.90 g, 99.2% yield), which had an IV=0.83 dlg$^{-1}$, a Tg=171° C. and a Tm=383° C.

EXAMPLE 4

To a 250 ml flanged flask equipped with a stirrer and purged with nitrogen was added 80 ml DCB, aluminium chloride (27.47 g, 0.206 mole), TPC (11.94 g, 0.0588 mole), NNDA (1.0 ml) and Antaron V220 (0.5 g, 1.49%), the flask and contents then being cooled in an ice bath. DPBP (21.52 g, 0.0588 mole) slurried in DCB (120 ml) was then added gradually over 10 minutes to the stirred contents of the flask resulting in an orange reaction mixture.

Following continued stirring of the mixture for 30 minutes, the flask was removed from the ice bath and the flask and the contents thereof were allowed to warm up to room temperature. After stirring at room temperature for 30 minutes, the flask and its contents were heated up to 115° C.–120° C. at which temperature it was held for four hours. During that period, a fine orange dispersion of polymer particles formed in the flask. The flask and its contents were then cooled to room temperature, stirring of the contents being maintained.

After being allowed to settle, the majority of the solvent was decanted off and the remaining contents of the flask were poured into methanol (200 ml).The resultant fine off-white granular solid was filtered off the liquor and washed with methanol on the filter. The product was then extracted with hot water in a soxhlet apparatus for four hours, filtered and washed with acetone before being dried in a vacuum oven.

The final product was a free-flowing off-white particulate solid (26.22 g, 89.7% yield), which had an IV=1.18 dlg$^{-1}$, a Tg=168° C. and a Tm=375° C. The polymer could be compression moulded at 400° C. for four minutes to give a tough film.

EXAMPLE 5

The reaction of Example 4 was repeated three times but using differing amounts of Antaron V220. The products were quenched in dilute HCl, washed with methanol and extracted with hot water in a soxhlet apparatus. The reactions of this example and of Example 4 are summarised in Table I.

TABLE I

| EXAMPLE | DISPERSANT MASS (g) | LEVEL % | % YIELD | IV (dlg$^{-1}$) | Tg (°C.) | Tm (°C.) |
| --- | --- | --- | --- | --- | --- | --- |
| Example 4 | 0.5 | 1.52 | 89.7 | 1.18 | 168 | 375 |
| Example 5(a) | 0.25 | 0.76 | 94.3 | 1.43 | 166.8 | 375 |
| Example 5(b) | 0.125 | 0.38 | 95.7 | 1.12 | 166.7 | 379.6 |
| Example 5(c) | 0.0625 | 0.19 | 64.2 | 0.26 | — | 379.9 |

The products were free-flowing solids except for Example 5(c) in which a dispersion was not produced. In that example, the reaction mixture had to be broken up by cooling in liquid nitrogen and grinding prior to the quenching of the mixture.

EXAMPLE 6

The reaction procedure outlined in Example 4 was repeated four times using Antaron V220 (0.5 g, 1.49%), DPBP (21.52 g, 0.0588 mole) and mixtures of TPC and IPC and IPC alone (total amount of TPC and IPC or IPC being 0.0588 mole).

The heating cycles for samples 6(a) and 6(d) were as described in Example 4.

The heating cycle for sample 6(b) was:

30 minutes at 0° C.

3 hours at room temperature 40 minutes at 75° C.

1 hour at 115° C.–120° C.;

and the heating cycle for sample 6(c) was:

30 minutes at 0° C.

3 hours at room temperature 35 minutes at 75° C.

90 minutes at 115° C.–120° C.

The samples were isolated as described in Example 4.

The product forming each sample was a free-flowing white particulate solid.

The reactions of this example are summarised in Table II.

TABLE II

| SAMPLE | TPC:IPC RATIO | % YIELD g. | % | IV (dlg$^{-1}$) | Tg (°C.) | Tm (°C.) |
|---|---|---|---|---|---|---|
| 6(a) | 50:50 | 26.90, | 92.0 | 0.94 | 153.7 | 326.3 |
| 6(b) | 60:40 | 25.04, | 85.69 | 1.43 | 157.4 | 336.4 |
| 6(c) | 70:30 | 23.55, | 80.6 | 1.58 | 159.7 | 342.2 |
| 6(d)* | 0:100 | 27.44, | 93.9 | 2.14 | 156.5 | — |

Samples 6(a), 6(b) and 6(c) were compression moulded at 380° C. to give relatively tough, tough and tough film, respectively.

EXAMPLE 7

(Comparative)

The reaction of Example 4 was repeated but using 0.67 g (2%) of benzoylated Kraton G 1650 (material 2 listed above) instead of the Anatron V220. The reaction produced a free-flowing off-white particulate solid (28.6 g, 97.9% yield) having an IV=1.71 dlg$^{-1}$, a Tg=167.2 and a Tm=370.6° C.

The product was compression moulded at 400° C. to give a dark brown brittle film.

EXAMPLE 8

(Comparative)

Example 7 was repeated using 0.5 g (1.5%) of benzoylated Kraton G 1650. The reaction produced a partially-dispersed polymer which was purified as in previous examples to give a white solid (not free-flowing) (21.59 g, 73.9% yield). The polymer had an IV=0.81 dlg$^{-1}$, a Tg=155.7° C. and a Tm=381.8° C.

EXAMPLE 9

(Comparative)

Example 4 was repeated using materials 3 to 13 above. All of the materials were added to the reactants at a 1.5% level and materials 3, 4, 8 and 12 were also added at a 3.0% level.

In all reactions, the materials had no observable dispersant effect, the polymer coagulating as it came out of the solution into large lumps of usually relatively low molecular weight material which had to be broken up to allow effective purification of the products.

EXAMPLE 10

Example 4 was repeated using 80 ml DCB, aluminium chloride (24.05 g, 0.1804 mole), TPC (8.12 g, 0.04 mole), Antaron V220 (0.5 g, 1.80%) and DPDPS (15.88 g, 0.04 mole) slurried in DCB (120 ml) which resulted in a yellow reaction mixture. The mixture was held at 115° C. to 120° C. for three hours during which time a finely dispersed solid formed.

The isolated product was an amorphous free-flowing white particulate solid (20.44 g, 96.6% yield) which had an IV=0.81 dlg$^{-1}$ and a Tg=189.6° C.

EXAMPLE 11

(Preparation of Monomer)

To a 1l flanged flask equipped with a stirrer and purged with nitrogen was added 500 ml DCB, the flask and contents then being cooled in an ice bath. Aluminium chloride (110.0 g, 0.80 mole) was added to the flask following which the contents of the flask were stirred. TPC (40.6 g, 0.20 mole) and DPO (170 g, 1 mole) dissolved in DCB (200 ml) were added slowly to the flask.

The flask was removed from the ice bath and the flask and the contents thereof were allowed to warm up to room temperature. After stirring at room temperature for six hours, the contents of the flask were poured into a methanol (1500 ml) concentrated HCl (12 ml) solution. A voluminous white precipitate formed which was filtered off the liquor and washed with methanol on the filter. The product was then extracted three times by refluxing with methanol followed by filtering and then with water and finally with acetone before being dried in a vacuum oven for three hours at 120° C.

The final product had a Tm=215° C. and was confirmed by $C^{13}$ nmr analysis to be 1,4-bis(4-phenoxybenzoyl) benzene.

EXAMPLE 12

Example 1 was repeated using 60 ml DCB, aluminium chloride (16.0 g, 0.116 mole), TPC (4.06 g, 0.02 mole), Antaron V220 (0.25 g, 1.86%) and 1,4-bis(4-phenoxybenzoyl)benzene (9.40 g, 0.02 mole), prepared as described in Example 11.

The isolated product was a free-flowing white particulate solid (11.85 g, 98.8% yield) which had an IV=2.1 dlg$^{-1}$, a Tg=172° C. and a Tm=384° C.

EXAMPLE 13

Example 1 was repeated using 150 ml DCB, aluminium chloride (16.0 g, 0.116 mole), TPC (2.84 g, 0.014 mole), IPC (1.22 g, 0.006 mole), Antaron V220 (0.25 g, 1.86%) and 1,4-bis(4-phenoxybenzoyl)benzene (9.40 g, 0.02 mole) prepared as described in Example. 11, but with the final reaction temperature being 80° C.

The isolated product was a free-flowing white particulate solid (11.55 g, 96.3% yield) which had an IV=1.91 dlg$^{-1}$, a Tg=167° C. and a Tm=355° C.

EXAMPLE 14

Example 13 was repeated but using 1,4-bis(4-phenoxybenzoyl)benzene (9.8 g, 0.0209 mole) prepared as described in Example 11, the Antaron V220 level being 1.80%.

The isolated product was a free-flowing white particulate solid (11.84 g, 95.4% yield) which had an IV=1.07 dlg$^{-1}$, a Tg=143° C. and a Tm=367° C.

EXAMPLE 15

Example 13 was repeated but using TPC (2.44 g, 0,012 mole), IPC 1.62 g, 0.080 mole) and 1,4-bis(4-phenoxybenzoyl)benzene (10.0 g, 0.0213 mole) prepared as described in Example 11, but with the final reaction temperature being 60° C.

The isolated product was a free-flowing white particulate solid (11.91 g, 94.4% yield) which had an IV=1.22 dlg$^{-1}$, a Tg=150° C. and a Tm=354° C.

EXAMPLE 16

(Comparative)

Example 15 was repeated but without the dispersant Antaron V220 being present. After 30 minutes at 60° C., the forming polymer coated the stirrer and the sides of the flask and following completion of the reaction, the crude product was a gummy mass.

The isolated product was a white coarse particulate solid (12.3 g, 98.2% yield) which had an IV=0.79 dlg$^{-1}$, a Tg=143° C. and a Tm=358° C.

EXAMPLE 17

Example 13 was repeated but using TPC (2.44 g, 0.12 mole), IPC (1.62 g, 0.00798 mole), Antaron V220 (0.10 g, 0.74%), 1,4-bis(4-phenoxybenzoyl)benzene (9.40 g, 0.02 mole) prepared as described in Example 11, and 1,4-phenoxydiphenylsulphone (0.60 g, 0.00149 mole) but with the final reaction temperature being 60° C. for three hours.

The isolated product was a free-flowing white particulate solid (11.68 g, 92.7% yield) which had an IV=1.35 dlg$^{-1}$, a Tg=158° C. and a Tm=352° C.

EXAMPLE 18

Example 13 was repeated but using TPC (2.44 g, 0.012 mole), IPC (1.62 g, 0.00798 mole), Antaron V220 (0.15 g, 1.1%), 1,4-bis(4-phenoxybenzoyl)benzene (9.40 g, .0.02 mole) prepared as described in Example 11, and 4-phenoxybenzophenone (0.22 g, 0.0008 mole) but with the final reaction temperature being 60° C. for three hours.

The isolated product was a free-flowing white particulate solid (11.21 g, 91.8% yield) which had an IV=1.02 dlg$^{-1}$ a Tg=153° C. and a Tm=358° C.

EXAMPLE 19

Example 18 was repeated but using 4-phenoxybenzophenone (0.44 g, 0.0016 mole).

The isolated product was a free-flowing white particulate solid (11.32 g, 91.0% yield) which had an IV=0.50 dlg$^{-1}$ a Tg=146° C. and a Tm=368° C.

EXAMPLE 20

(Comparative)

Example 19 was repeated but the 4-phenoxybenzophenone was added to the reaction mixture after one hour of reaction at 60° C. instead of at the ice bath stage.

The isolated product was a free-flowing white particulate solid (10.76 g, 86.5% yield) which had an IV=1.50 dlg$^{-1}$, a Tg=159° C. and a Tm=348° C.

We claim:

1. A process for making a polyarylketone comprising polycondensing at least one aromatic monomer capable of undergoing electrophilic substitution to form a polyarylketone in the presence of a Lewis acid capable of activating the condensation reaction and a dispersant for the polymer, said dispersant comprising a polymer having first pendent groups which are substantially compatible with the reaction mixture but are substantially incompatible with the polymer, said first pendent groups being aliphatic chains, and second pendent groups which comprise Lewis bases.

2. A process according to claim 1, in which the dispersant is selected such that the ratio of said first groups to said second groups is less than 2:1.

3. A process according to claim 1, in which the dispersant is present in quantities of not more than 2%.

4. A process according to claim 1, in which the dispersant has an aliphatic polymer backbone to which the pendent groups are attached.

5. A process according to claim 1, in which said aliphatic chains have a length of between 10 and 30 carbon atoms.

6. A process according to claim 1, in which the second pendent groups contain a nitrogen atom.

7. A process according to claim 1, in which the second pendent groups contain an oxygen atom.

8. A process according to claim 1, in which the second pendent groups include a moiety of general formula

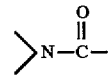

9. A process according to claim 8, wherein said moiety forms part of a cyclic moiety.

10. A process according to claim 9, wherein said cyclic moiety is N-pyrollidone.

11. A process according to claim 1, in which the dispersants are selected from copolymers of aliphatic vinyl compounds and N-vinyl pyrollidone.

12. A process according to claim 1, in which said at least one monomer is selected from monomers comprised by a divalent aromatic residue consisting of one or more phenylene units connected by linkages selected from a direct link, —O—, —S—, —CO—, —SO$_2$— or —CR$_2$— where R is hydrogen, C$_1$ to C$_4$ alkyl, phenyl or the two groups R (which otherwise may be the same or different) are joined externally to form a cycloaliphatic ring, are present or of polynuclear aromatic units either alone or with like units and/or phenylene units linked as aforesaid.

13. A process according to claim 1, in which said at least one monomer is selected such that the ratio of —SO$_2$— linkages to —CO— linkages between aromatic moieties is not more than 1:5.

14. A process according to claim 1, in which said acid is selected from aluminium chloride, aluminium bromide, ferric chloride, ferric bromide, antimony pentachloride, titanium tetrachloride, gallium chloride, molybdenum hexachloride and zinc chloride.

15. A process according to claim 1 in which said at least one monomer is selected such that the ratio of —SO$_2$— linkages to —CO— linkages between aromatic moieties is not more than 1:10.

16. A process according to claim 1 in which said acid is selected from aluminum chloride or aluminum bromide.

* * * * *